United States Patent
Becker (10) Patent No.: US 9,868,318 B2
(45) Date of Patent: *Jan. 16, 2018

(54) ILLUMINATED VEHICLE WHEEL

(71) Applicant: Mark L. Becker, Lemont, IL (US)

(72) Inventor: Mark L. Becker, Lemont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,509

(22) Filed: Aug. 16, 2016

(65) Prior Publication Data
US 2017/0136813 A1    May 18, 2017

Related U.S. Application Data (63) Continuation-in-part of application No. 14/942,030, filed on Nov. 16, 2015, now Pat. No. 9,428,007.

(51) Int. Cl.
| | | |
|---|---|---|
| *B60B 7/00* | (2006.01) | |
| *B60B 7/14* | (2006.01) | |
| *B60B 7/16* | (2006.01) | |
| *B60Q 1/32* | (2006.01) | |
| *F21V 19/00* | (2006.01) | |
| *F21V 23/00* | (2015.01) | |
| (Continued) | | |

(52) U.S. Cl.
CPC .............. *B60B 7/006* (2013.01); *B60B 7/065* (2013.01); *B60B 7/14* (2013.01); *B60B 7/16* (2013.01); *B60Q 1/326* (2013.01); *F21V 17/12* (2013.01); *F21V 19/0055* (2013.01); *F21V 23/005* (2013.01); *F21V 23/0435* (2013.01); *B60B 7/04* (2013.01); *B60B 2900/572* (2013.01); *F21Y 2115/10* (2016.08)

(58) Field of Classification Search
CPC ......... B60Q 1/326; B60B 7/006; B60B 7/065; B60B 7/14; B60B 7/16; F21V 17/12; F21V 19/0055; F21V 23/005; F21V 23/0435
See application file for complete search history.

(56) References Cited

U.S. PATENT DOCUMENTS

| | | |
|---|---|---|
| 1,744,915 A | 1/1930 | Nelson |
| 2,289,448 A | 7/1942 | Monroe |
| (Continued) | | |

OTHER PUBLICATIONS

Fantasmaowl, Brochure, Shiniest Industries, Inc., 9F-5, No. 189 Keelung Road, Sec. 2, Taipei 11054, Taiwan, Nov. 3, 2015.
(Continued)

*Primary Examiner* — Mary Ellen Bowman
(74) *Attorney, Agent, or Firm* — Perkins IP Law Group LLC; Jefferson Perkins (57) ABSTRACT

A lighting module has axial screws that extend axially rearwardly from a rearward surface of the module base and are respectively received in hollow screw bores extending axially rearwardly from a module mounting face of a vehicle wheel. A wheel that receives the lighting module has an axially inwardly facing sidewall into which are formed plural hollow bolt receivers. For each such bolt receiver, a keyed lock assembly having a radial bolt is provided within the body of the module. The bolt is operable to extend radially outwardly through a module bolt hole to a locked position within a respective wheel rim bolt receiver, locking the module to the wheel, and to be retracted radially inwardly to an unlocked position. A transparent cover of the lighting module protects plural LEDs mounted on a forward face of a circuit board.

19 Claims, 9 Drawing Sheets

(51) Int. Cl.
*F21V 23/04* (2006.01)
*F21V 17/12* (2006.01)
*B60B 7/06* (2006.01)
*F21Y 115/10* (2016.01)
*B60B 7/04* (2006.01)

(56) References Cited

U.S. PATENT DOCUMENTS

| | | |
|---|---|---|
| 2,333,356 A | 11/1943 | Blanchet |
| 2,670,245 A | 2/1954 | Kimerer |
| 5,683,164 A | 11/1997 | Chien |
| 6,644,839 B2 * | 11/2003 | Lee ............... G02B 6/0006 362/500 |
| 6,776,458 B1 | 8/2004 | Wang |
| 6,936,980 B2 | 8/2005 | Wang |
| 7,354,182 B2 | 4/2008 | Bartels |
| 7,753,572 B2 | 7/2010 | Wang |
| RE42,140 E | 2/2011 | Kemmerer et al. |
| 8,845,035 B2 | 9/2014 | Heck et al. |
| 8,985,822 B2 | 3/2015 | Bartels et al. |
| 2003/0223243 A1 * | 12/2003 | Miller ............... B60Q 1/326 362/487 |
| 2004/0257825 A1 * | 12/2004 | Choi ............... B60Q 1/326 362/500 |
| 2005/0140201 A1 | 6/2005 | Wang |
| 2005/0212348 A1 | 9/2005 | Cheng |
| 2006/0125310 A1 * | 6/2006 | Miansian ............... B60B 7/20 301/37.25 |
| 2007/0058385 A1 * | 3/2007 | Chen ............... B60Q 1/326 362/500 |
| 2007/0274085 A1 | 11/2007 | Hampton |
| 2011/0210600 A1 | 9/2011 | Lin |
| 2012/0320614 A1 * | 12/2012 | Malone ............... B60Q 1/326 362/500 |
| 2013/0076107 A1 | 3/2013 | Starnes et al. |
| 2014/0043839 A1 | 2/2014 | Bartels et al. |
| 2014/0254821 A1 | 9/2014 | Boyce |

OTHER PUBLICATIONS

International Searching Authority, Written Opinion of the International Searching Authority, Form PCT/ISA/237, Jan. 12, 2017.

* cited by examiner

ILLUMINATED VEHICLE WHEEL

RELATED APPLICATIONS

This application is a continuation in part of pending U.S. patent application Ser. No. 14/942,030 filed Nov. 16, 2015, owned by the Applicant hereof. The entire disclosure and drawings of the last said application are fully incorporated by reference herein.

BACKGROUND OF THE INVENTION

Decorative wheel covers have adorned vehicle wheels for almost a century. More recently, attempts have been made to provide lighted or illuminated wheel covers. While there are many commercial applications of electrical lamps, particularly light emitting diodes (LEDs), to various nonrotating parts of vehicles, few solutions to the illumination of rotating vehicle wheels have been commercially successful.

The environment surrounding a typical vehicle wheel is a hostile place for electrical lamps (including LEDs) and the electronics that drive them. An automobile wheel rotates at speeds of up to 17 revolutions per second or more, depending on vehicle speed and rim and tire size. The surface over which the wheel is travelling often is bumpy. The wheel is routinely exposed to water, silica, road salt and other particulate and fluid substances. A commercially successful illuminated wheel, therefore, must withstand all of these environmental stresses and still function.

SUMMARY OF THE INVENTION

According to one aspect of the invention, an illuminated wheel is provided that includes a wheel rim and a lighting module for attachment to the wheel rim. The wheel has a sidewall that faces inwardly toward the axis. A lighting module seating surface is formed on a front face of the rim, at an angle to the axis, and to be disposed radially inwardly from the sidewall of the rim. Plural pin guides are formed in parallel to the axis to extend axially rearwardly from the lighting module seating surface. These pin guides are spaced apart from each other. Plural bolt holes are formed in the sidewall of the rim to extend radially outwardly from the rim sidewall. For each bolt hole, a bolt is provided. The bolt is slidably housed in the bolt hole and has an inner radial end. The bolt is operable to extend in a radial direction toward the axis so that the bolt assumes a locked position, attaching the lighting module to the rim. The bolt is retractable into the bolt hole in a radial outward direction so that the end thereof assumes an unlocked position.

The lighting module has a base and a plurality of pins that extend axially rearwardly from a rear surface of the base to be received in respective ones of the pin guides formed in the wheel rim. A sidewall of the lighting module extends axially forwardly from the rear surface of the base. A plurality of hollow bolt receivers are each formed to extend radially inwardly from the lighting module sidewall and to be angularly spaced apart from each other. Each bolt receiver is adapted to receive an end of a respective bolt when the end is in the locked position.

In another aspect of the invention, a lighting module is provided for affixation to a vehicle wheel. The lighting module has a base with an axially rearward surface formed at an angle to the wheel axis and a sidewall that extends axially forwardly from the inward surface. Plural mounting pins extend rearwardly from the rearward surface of the base and so as to be spaced apart from each other. In one embodiment, the mounting pins slide within respective axially aligned housings and are spring-biased to an axially rearwardly extended condition. A plurality of hollow bolt receivers are formed in the module sidewall so as to be angularly spaced apart from each other. An electronic circuit board is affixed to the module base and has a rearward surface disposed adjacent to the base and a forward surface disposed in opposition to the base. A plurality of light emitting diodes are affixed to the forward surface of the circuit board. The module further includes a transparent cover or lens that is affixed to the base so as to cover the forward surface of the circuit board. In one embodiment, integrated circuits comprising a logic circuit are mounted on the rearward side of the circuit board and are coupled to the light emitting diodes to selectively switch them on and off.

According to another aspect of the invention, an illuminated wheel comprises a wheel rim and a lighting module. The wheel rim has a sidewall inwardly facing the wheel axis and at least one lighting module seating surface or mounting face disposed axially inwardly from the sidewall and at an angle to the axis. Plural module attachment bores extend from the lighting module seating surface(s) in parallel to the axis. A plurality of hollow bolt receivers are formed in the sidewall of the rim to extend radially outwardly therefrom and to be angularly spaced apart from each other around the axis. The lighting module has a plurality of module attachment screws, ends of which extend axially inwardly from the rear surface of the base of the module to be received in respective ones of the wheel rim attachment bores. The module has at least one sidewall that extends axially forwardly from the module base. A plurality of bolt holes are formed in the lighting module sidewall to be angularly spaced apart from each other, and a respective radial bolt is received into each of these bolt holes. Each bolt has a radially outer end. The bolt is operable to extend in a radial direction away from the wheel axis so that its outer end is disposed in a respective wheel rim bolt receiver, thereby assuming a locked position. The bolt is operable to be retracted in a direction toward the axis so that the outer radial end is disposed radially inwardly from the respective bolt receiver, thereby assuming an unlocked position.

In a further aspect of the invention, a lighting module is provided for attachment to a vehicle wheel. A plurality of module attachment screws extend axially inwardly from a rear surface of a base of the module, so as to be received into respective bores in the vehicle wheel. The module has a sidewall extending axially forwardly from the base and a plurality of bolt holes are formed in it. The bolt holes are angularly spaced around the wheel axis. Each bolt hole has a respective bolt received therein. The bolt is operable such that its radially outer end extends radially beyond the outer surface of the module sidewall and engage structure on the vehicle wheel (such as a hollow bolt receiver) to assume a locked position. The bolt further is operable such that its outer end is retracted radially inwardly so as to be spaced from that vehicle wheel structure, thereby assuming an unlocked position. An electronic circuit board is affixed to the base. A forward side of the circuit board is populated with a plurality of light-emitting diodes. A transparent cover is affixed to the base to cover the forward side of the circuit board.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
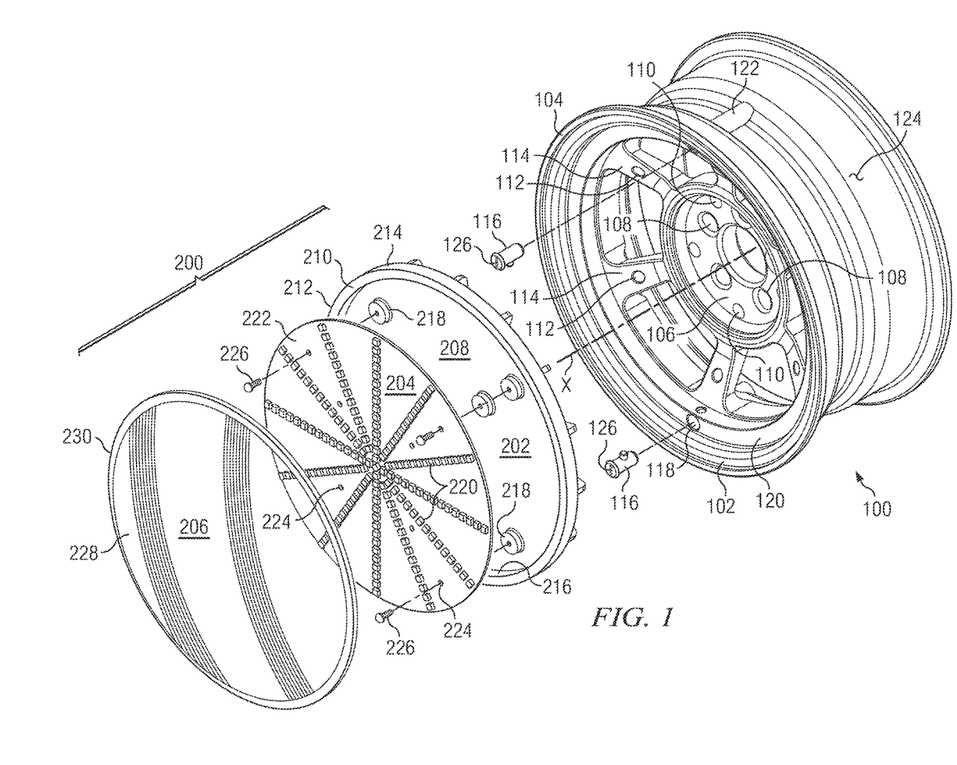
FIG. 1 is an exploded perspective front view of one embodiment of an illuminated wheel according to the invention.
Figure 2:
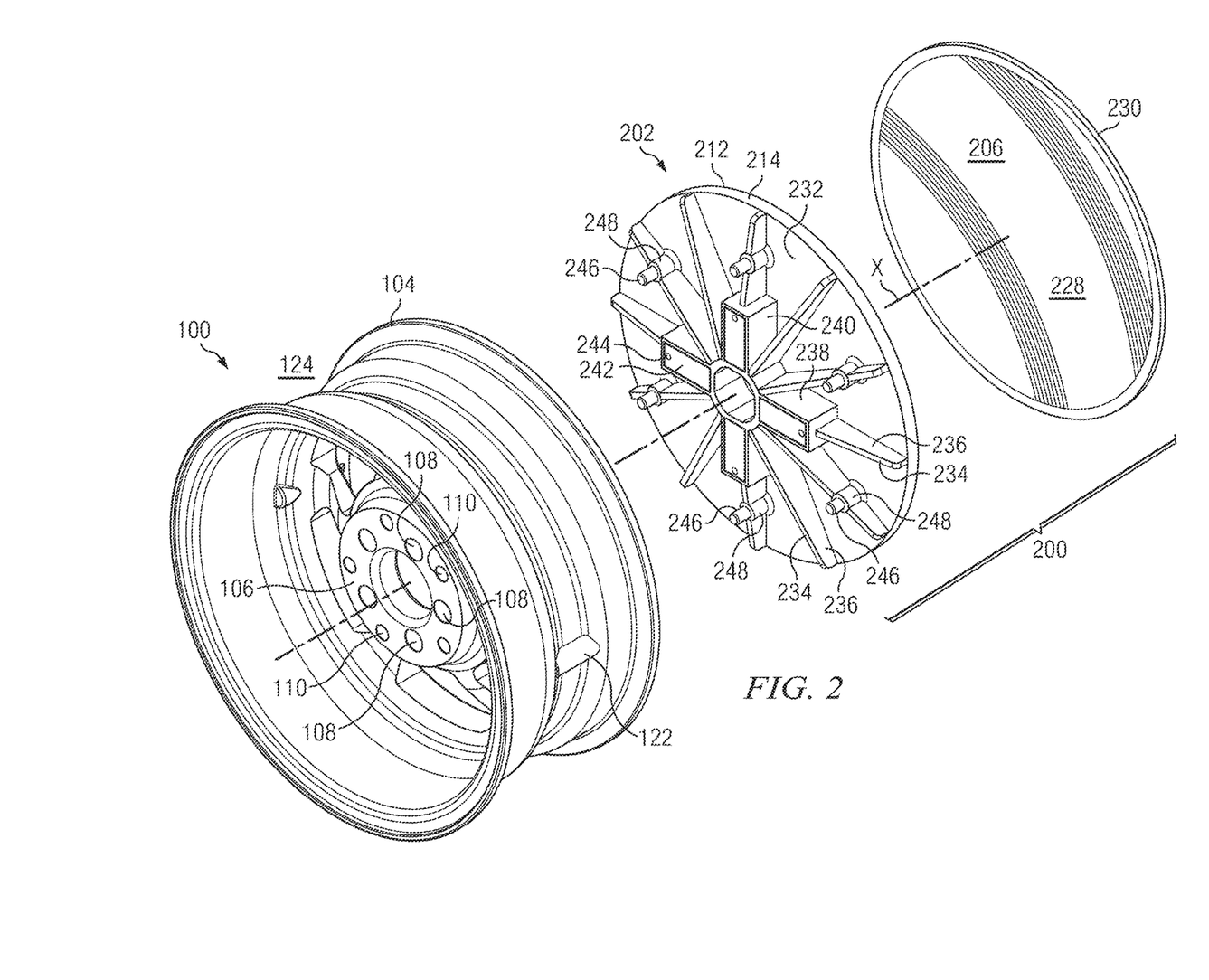
FIG. 2 is an exploded perspective back view of the illuminated wheel shown in FIG. 1.
Figure 3:
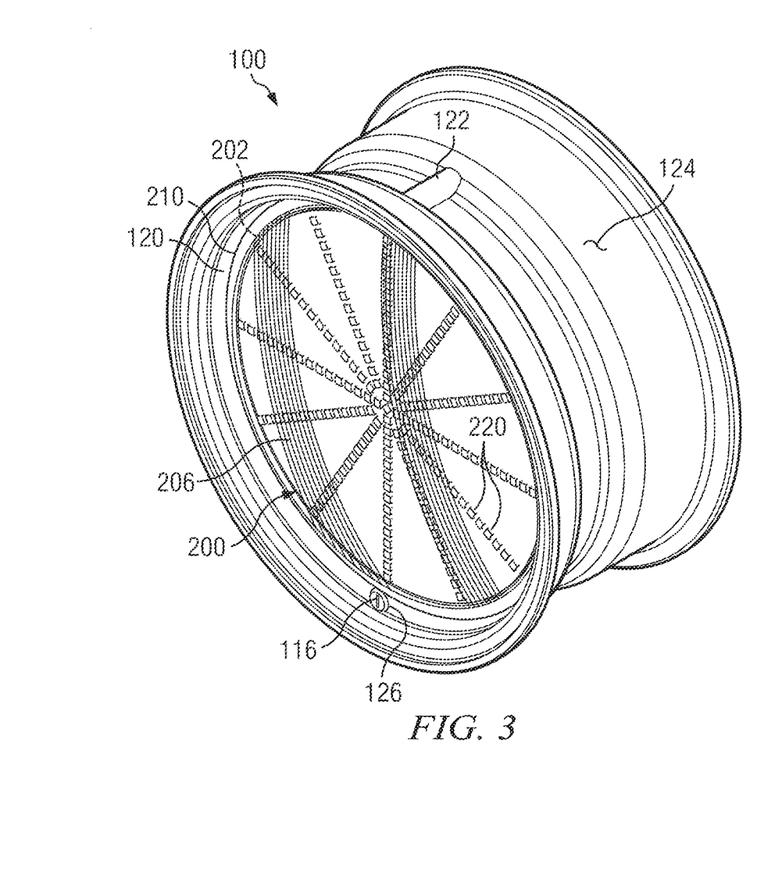
FIG. 3 is a perspective front view of the illuminated wheel shown in FIG. 1, shown in an assembled condition.

As seen in FIGS. 1-3, an illuminated vehicle wheel according to the invention has two main components: a wheel rim 100 and a lighting module 200 that fits within the wheel rim.

The wheel rim 100 may be cast metal, such as aluminum, and is adapted to have a conventional vehicle tire (not shown) mounted to it. It is formed around a wheel axis X. The overall diameter of the rim 100 may be 16¼ inches for a standard sixteen-inch wheel, but alternatively could be any of many other standard wheel sizes. A forward or front face 102 of the rim 100 has a generally concavely dished aspect, such that an outer annular flange 104 is displaced axially forwardly of an annular lug plate 106. The lug plate 106 has formed in it a plurality of wheel lug holes 108 that are meant to receive respective ones of the vehicle wheel lugs (not shown). In the illustrated embodiment, there are five lug holes 108 but this number may be increased or decreased according to the make and model of the vehicle for which the rim 100 is made. The lug holes 108 are formed in parallel to axis X and, in the illustrated embodiment, are radially spaced from the axis X by a constant distance.

In the illustrated embodiment, the lug plate 106 also has a number of parallel threaded mounting holes 110 that are formed in parallel to the axis X, are angularly spaced apart from each other by a constant distance, and are radially spaced from the axis X by a distance that is greater than the radial locus of the lug holes 106. The mounting holes 110 may be used to mount wheel ornaments other than the lighting module described herein. The illustrated embodiment has five mounting holes 110, but their number and position may be varied away from the embodiment shown.

Disposed at an even greater radial distance away from axis X are a plurality of hollow pin guides 112. Each pin guide 112 is a blind smooth bore formed in parallel to axis X. In the illustrated embodiment, there are six such pin guides 112, angularly spaced from each other by a constant distance. In other embodiments, there may be fewer or more pin guides 112. In the illustrated embodiment, each pin guide 112 is housed in a respective wheel rim spoke 114, but in other embodiments, the wheel rim 100 may be solid and not spoked.

Two or more wheel lock cylinders 116 (only one is shown in FIG. 1) are inserted into respective wheel lock cylinder bores 118 (one shown in FIG. 1). In the illustrated embodiment, there are two lock cylinders 116 that are angularly separated from each other around axis X by 180 degrees. In other embodiments more lock cylinders may be provided, preferably at equal angular spacings from each other around rim surface 120. Each wheel lock cylinder bore 118 may be formed to be parallel to axis X and is radially spaced from axis X by a distance that is greater than the radial spacing of pin guides 112 from axis X. In the illustrated embodiment, the lock cylinder bores 118 are formed to extend axially inwardly from a circumferential surface 120 that may be annular or frustoconical. The surface 120 is axially forward from lug plate 106 but axially rearward from outer annular flange 104. The cylinder bores 118 may be threaded.

In the illustrated embodiment, in which the rim 100 is cast metal, each cylinder bore 118 is surrounded by a cylinder bore housing 122 that extends axially rearwardly from the surface 120. The housing 122 separates the bore 118 from the tire space 124 that will be occupied by an inflated vehicle tire (not shown), permitting the tire to hold air pressure. A respective front or forward face 126 of each lock cylinder 116 may accept a key (not shown), which may be rotated in one direction to lock the module 200 to the rim 100, and which may be rotated in the opposite direction to unlock the module 200 from the rim 100.

Lighting module 200 has three main components: a base 202, an electronic circuit board 204 and a cover or lens 206. The base 202 may be integrally formed, as by injection molding, of a tough thermoplastic polymer such as ABS. A general forward surface 208 of the base 202 may be planar and at right angles to axis X and may be sunk by a predetermined distance from a forward face 210 of a circumferential sidewall 212. The sidewall 212 has an radially outward cylindrical surface 214 that will fit within the wheel rim 100 as will be described in further detail, and has a radially inward cylindrical surface 216. A plurality of spaced-apart circuit board mounting bosses 218 extend axially forwardly from general forward surface 208 by a distance that is less than a depth of the inward cylindrical surface 216.

Figure 5:
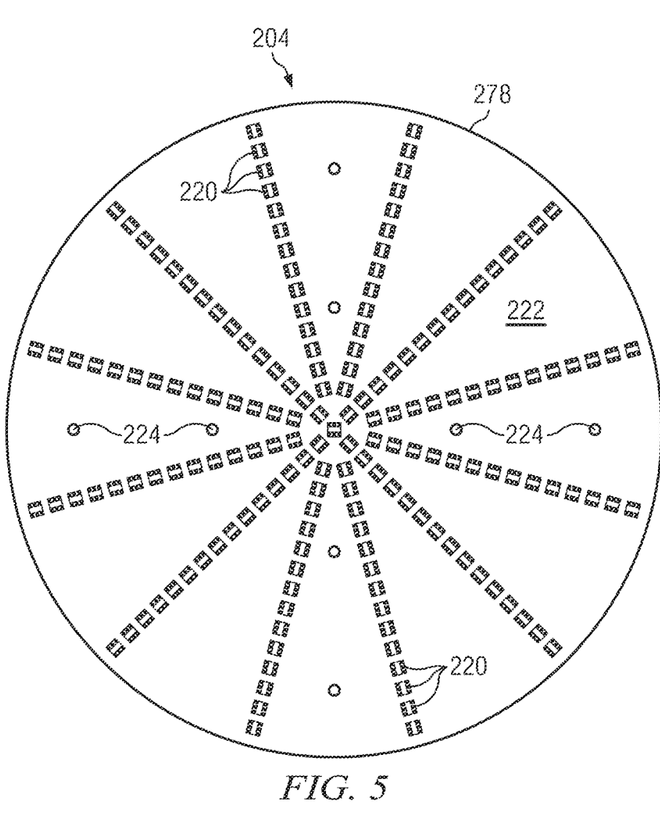
FIG. 5 is a front view of the lighting module and rim of FIGS. 1 and 3-4.

A plurality of light emitting diode (LED) integrated circuits (ICs) 220 are mounted on a forward face 222 of the circuit board 204. The circuit board 204 may be mounted at right angles to axis X. The LEDs 220 may be disposed in a spoke pattern as shown in FIG. 5 or in any of many other patterns. In the illustrated embodiment, there are 173 LED ICs 220, each of which have red, blue and green LED emitters proper, but the number of LED ICs 220 may be varied from the example shown. The circuit board 204 in this embodiment is circular, and its radius is less than the radius of inward cylindrical surface 216 of base 202. A plurality of circuit board mounting holes 224 match, in number and radial and angular position, the mounting bosses 218, and the circuit board and the components mounted thereon are assembled to base 202 by respective screws 226.

The lens 206 may be molded of a tough transparent plastic such as polycarbonate. The lens 206 has a central convex portion 228 that is disposed radially inwardly from an outer annular flange 230. The flange 230 of lens 206 mates to annular surface 210 of base 202, and may be joined thereto by adhesive, mounting screws (not shown) or a combination thereof.

As seen in FIG. 2, the base 202 has a general rearward surface 232 that may be flat. In one embodiment, the base 202 is adapted to fit against a substantially conical or concave, forward-facing seating surface 128 (see FIG. 4) of the wheel rim 100. In this instance, a mating, generally convex surface is built up with structure extending rearwardly from the general rear surface 232. In the illustrated embodiment, this mating convex surface is defined by rearward edges 234 of respective rayed fins 236 that are equally angularly spaced around axis X. The fins 236 are integrally molded with the base 202 and extend rearwardly from the general rear surface 232. A thickness of each of the fins 236 may be the same as a nominal injection molding thickness used to design the preferably plastic base 202. By using fins 236 or other relatively thin structures, a large volume of plastic can be avoided, which will enhance moldability. In other embodiments, the fins 236 may be replaced or augmented by other rearwardly extending, thin structures, such as for example an intersecting network of walls. In the illustrated embodiment, and in conformity to the general concave nature of the rim seating surface 128 with which they are adapted to mate, the fins 236 are deeper near axis X than they are near outward cylindrical surface 214 of base 202.

Also extending rearwardly from the general rear surface 232 are a plurality of battery housings 238. The battery housings 238 are adapted to contain respective battery packs as will be described below. Each housing 238 has a peripheral wall 240, which may have the nominal injection molding thickness, and which defines a rectangular/prismatic, rearwardly facing receptacle for a respective battery pack. A rearward face of each battery housing 238 includes a battery housing door 242 that may be affixed to the rest of housing 238 as by means of a flange 243 (see FIG. 4) and an opposed screw 244. The battery housings 238 should be equally angularly distributed around axis X so as to minimize wheel and module balancing problems; the battery packs that the battery housings contain are relatively heavy and their weight should be equally angularly distributed around axis X. Also for this reason, it is preferred that the battery housings 238 be positioned as close to axis X as is practicable. While four battery housings 238 are shown, their number can be increased or decreased according to the energy requirements of the lighting module electronics. While in the illustrated embodiment the housings 238 each occupy an angular position also occupied by an associated fin 236, they could be disposed otherwise.

Also seen extending rearwardly from the general rear surface 232 of base 202 are a plurality of axially oriented mounting pins 246. The radial and angular position of each mounting or alignment pin 246 matches that of a corresponding pin guide 112. The axial mounting pins 246 are spaced apart from each other and may be equally angularly distributed around axis X, as shown. In the illustrated embodiment, each mounting pin 246 slides in an axial direction relative to a respective mounting pin housing 248. In the illustrated embodiment, each mounting pin 246 takes the form of a cylinder and is rearwardly biased so as to protrude rearwardly out of pin housing 248. The mounting pins 246 nevertheless are captured by their respective housings 248 and may not be separated from them. In the illustrated embodiment, there are six axial mounting pins 246 and their angular positions are shared by respective fins 236. Their angular positions around axis X could be otherwise. Also, in the illustrated embodiment, the axial mounting pins 246 are each displaced by a constant radius from axis X, but this could be altered also. The housings 248 may be integrally molded with base 202 and may extend rearwardly from the general rear surface 232 of the base 202; the chambers defined by each of the housings 248 may also extend axially forwardly from general rear surface 232 of base 202.

FIG. 3 shows a lighting module 200 as mounted to a wheel rim 100. The outer sidewall surface 210 of base 202 is disposed radially inwardly from wheel rim surface 120. This permits access to the front face 126 of the wheel lock cylinders 116, and allows a user to lock module 200 to rim 100, and to unlock module 200 from rim 100, with a key (not shown).

Figure 4:
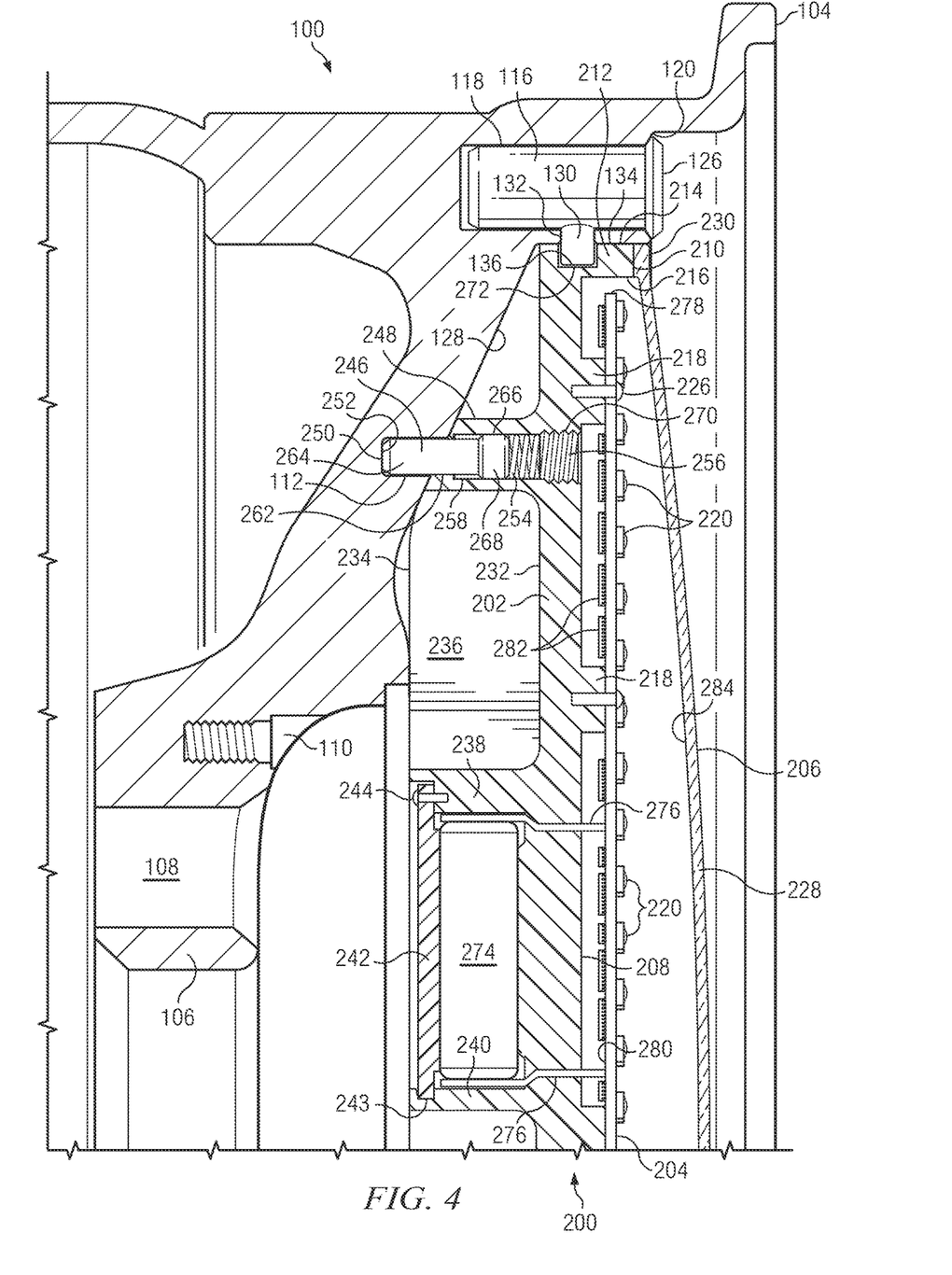
FIG. 4 is a sectional view of one-half of the illuminated wheel shown in FIGS. 1-3, taken in a plane including an axis of the wheel.

With reference to FIG. 4, a representative mounting pin 246 is shown received within a respective pin guide 112. Each pin guide 112 extends axially rearwardly from a lighting module seating surface 128. A rearward end 250 of the mounting pin 246 is in contact with a bottom 252 of the pin guide 112, which can be a smooth bore. The mounting pin 246 is urged to this disposition by a helical spring 254 that pushes the pin 246 away from a pin housing cap 256. The spring force of helical spring 254 therefore urges base 202 forwardly from the seating surface 128, mitigating any rattling of the module 200 relative to rim 100 and any vibration which otherwise may be transmitted by rim 100 to module 200.

An internal sidewall of the pin housing 248 may be formed by a bore 258 that extends from a general front face 208 of the module base 202. The bore 258 has a rearward portion 262 sized to slidably fit the main shaft 264 of the mounting pin 246. A middle portion 266 of the bore 258 is sized to slidably fit a head 268 of the pin 246; the diameters of head 268 and portion 266 are larger than the respective diameters of main shaft 264 and rearward portion 262. A forward portion 270 of the bore 258 is threaded and receives the pin housing cap 256 after the pin 246 and spring 254 are installed therein.

Each lock cylinder 116 has a bolt 130 that reciprocates into and out of the lock cylinder body in response to, e.g., twisting a key (not shown) in the lock cylinder 116. In FIG. 4, the bolt 130 is shown in its radially inwardly extending, locked position. The bolt 130 may be cylindrical and may reciprocate along a right radius from axis X. The bolt 130 extends through a bolt hole 132 that is formed in a sidewall surface 134 of the wheel rim 100. The sidewall 134 may be cylindrical around axis X and extends axially rearwardly from an annular or frustoconical wheel rim surface 120. When bolt 130 is in a retracted position, its end 136 will be either flush with, or radially outwardly recessed from, the rim sidewall surface 134.

In its locked position, the bolt 130 will radially inwardly extend into and be closely received within a respective bolt receptacle or receiver 272 that in turn is formed to radially inwardly extend from outward cylindrical surface 214 of base 202. In one embodiment, to mount the module 200 to a rim 100, the user must press the module 200 inward against the spring force of pin springs 254, until the bolts 130 are in alignment with the hollow bolt receivers 272. This force-fit takes out a source of rattling.

In this illustrated embodiment, the rim sidewall 134 and the rim module seating surface 128 form a cavity into which the module base 202 is closely received.

Contained within each battery housing 238 (or, in some embodiments not requiring as much energy, some of them) is a battery pack 274. The battery packs 274 supply a source of DC power to power supplies on the circuit board 204 through appropriate conductors 276.

The circuit board 204 has a radial edge or periphery 278 that intentionally is spaced away from the inner surface 216 of base sidewall 212. This is to prohibit the transmission to board 204 of any vibration from this source. The circuit board 204's sole structural connection to the base 202 is through the circuit board mounting bosses 218. The circuit board 204 has a general rearward surface 280 on which are mounted a large number of logic and driver components 282. Components 282 mostly are integrated circuits but also may include a number of discrete, relatively large devices such as resistors, inductors and capacitors. The height of the tallest of these electronic components 282 defines an overall rear component height. The height (in an axial direction) of the circuit board mounting bosses 218 from general forward surface 208 is chosen to be larger than the overall rear component height, as including any potting or coating (such as an epoxy coating). Electronic components 282 supply power to and control the operation to the LED ICs 220 on the forward surface 208 of board 204.

The tallest of the LED ICs 220 (in the illustrated embodiment, their height is uniform) defines an overall height of the LED ICs 220. A depth of the cylindrical surface 216 is chosen to be greater than a sum of the height of mounting bosses 218, the thickness of board 204, and the overall height of LED ICs 220. In this way, the circuit board 204 and LED ICs 220 will reside in a recess and be protected by module base sidewall 212. An inner surface 284 of lens 206 is forwardly spaced from LED ICs 220 at all points.

Figure 6:
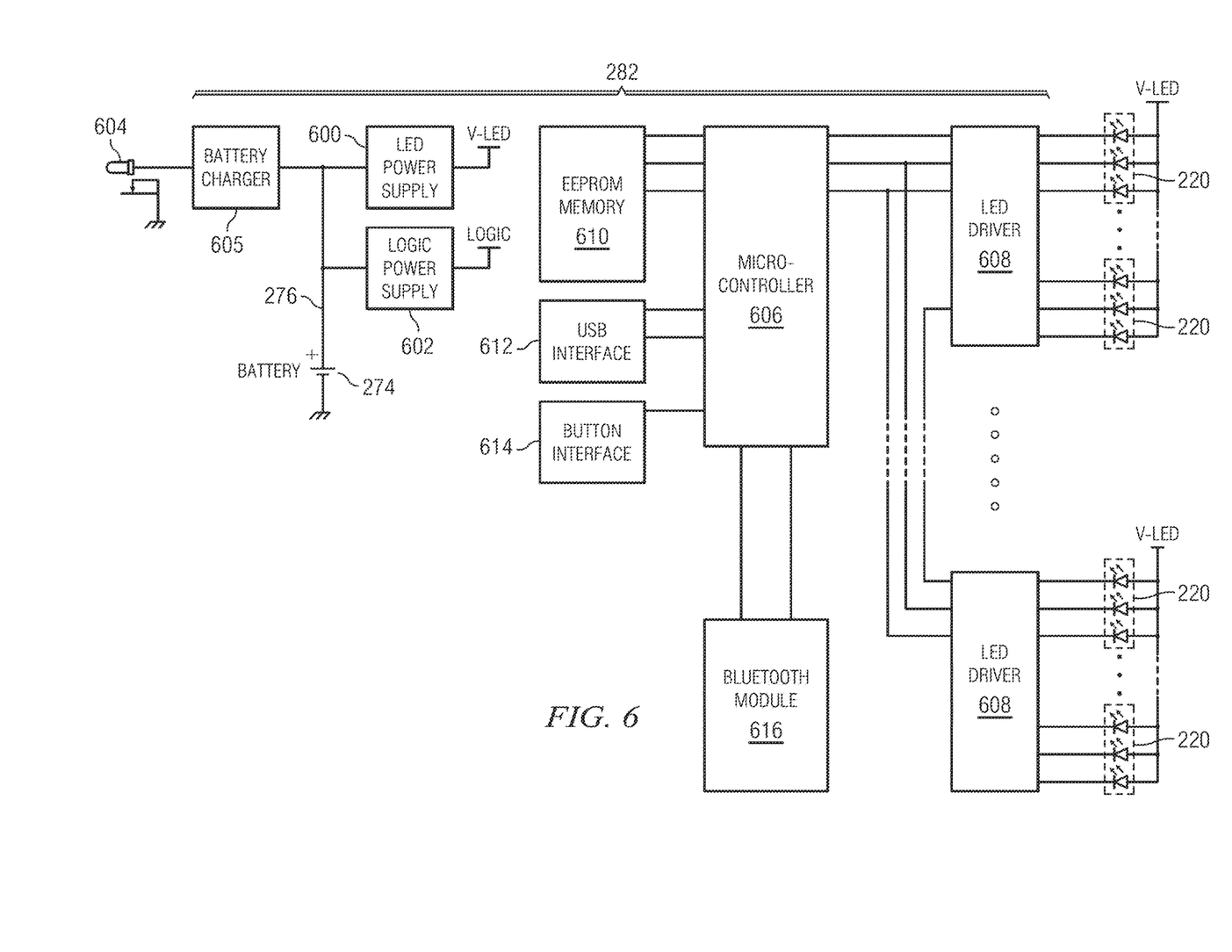
FIG. 6 is a schematic electrical circuit diagram of light emitting diodes and control circuitry capable of being used in the embodiments shown in FIGS. 1-5 and 7-10.

An electronic schematic diagram for the lighting module 200 is shown in FIG. 6. Battery packs 274 constitute a main battery array that feeds DC voltage to an LED power supply 600 and a logic power supply 602. Power supplies 600 and 602 respectively supply power to the LED ICs 220 and to the other logic circuits 282 mounted on the rear face 280 of board 204. A recharging port 604 may be supplied that is connected to the battery array 274 via a battery charger IC 605; port 604 conveniently could be positioned on the rear face 232 of base 202, and would be accessed by the user after the user dismounts the module 200 from rim 100.

A microcontroller 606 is connected to each of an array of LED driver ICs 608 to control their operation, and each LED driver 608 in turn selectively drives up to 16 LED ICs 220 according to signals received from the microcontroller 606. Each LED IC 220 is constituted by a red LED, a green LED and a blue LED so that any of a complete spectrum of colors can be obtained. An EEPROM memory 610 may be coupled to microcontroller 606 to store operational programs that, upon retrieval by microcontroller 606, would dictate the selection, timing and sequence of turning on and off each of the LED ICs 220 and the color balance of each. A USB interface can be connected to the microcontroller 606 to provide user programming of the lighting module 200. Another user interface connected to microcontroller 606 could be button interface 614, which for example could provide a capability to manually turn on or turn off the entire unit and/or initiate a stored test sequence. If provided, a corresponding USB port (not shown) and mechanical button (not shown) could be disposed on the rear surface 232 of base 202, in suitable recesses. Finally, the microcontroller 606 can be connected to an on-board wireless receiver or Bluetooth module 616 that would permit short-distance wireless communication to the microcontroller 606. A user could use Bluetooth module 616 to command microcontroller 606 to turn on or off the entire lighting module 200, to retrieve and execute one of many operational programs stored in EEPROM 610, to program the EEPROM 610 and to perform various diagnostics.

In the embodiment shown in FIGS. 7-10, a vehicle wheel 700 is provided with a flat annular module mounting face or seating surface 702 against which a flat, axially rearwardly facing surface 704 of a base 706 of a lighting module 708 may mate. The mounting face 702 may be a single connected surface or may be constituted by several surfaces that are angularly spaced apart from each other. While surfaces 702 and 704 are shown to be flat and perpendicular to axis X, alternatively they could be any pair of complementary surfaces (such as curved ones) at various angles with respect to axis X. The base 706 may be injection-molded of a polymer such as polycarbonate.

In this illustrated embodiment, the module base 706 is round and has a radial outer perimeter 711 that fits, to within a close tolerance, to a substantially cylindrically shaped sidewall 710 of the wheel 700. In other embodiments, the perimeter 711 of base 706 may be considerably radially inwardly spaced from wheel sidewall 710. The base 706 has a rectangularly shaped, single, central battery receptacle 712 that is disposed on the axis X of the module 708 and wheel 700. The battery receptacle 712 has a floor 716 (FIG. 9) that is positioned axially rearwardly from the annular surface 704, which radially surrounds it on all sides. In the illustrated embodiment, receptacle 712 is sized to receive one row of a two-row pack of batteries 714. In the illustrated embodiment the batteries 714 are cylindrical, but the shape and number of batteries 714 and the receptacle 712 in which they are partially housed may be changed to suit energy storage requirements of particular applications.

A preferably transparent module cover 718 has a central, slightly convex lens 720 and a substantially cylindrical sidewall 722 with which it preferably is integrally molded, and which extends axially rearwardly from the lens 720. The cover 718 may be molded from a transparent polymer compound such as Lexan®. In this illustrated embodiment, sidewall 722 is not completely cylindrical but is sloped from its axially rearward edge or seat 724 to its juncture, axially forward but radially slightly inward, with lens 720. In this illustrated embodiment sidewall 722 is slightly frustoconical but alternatively could assume any other surface of rotation around axis X. In another embodiment, the single, endless sidewall 722 could be replaced with a plurality of planar sidewalls or facets that are connected together around axis X. In any case, the sidewall(s) 722 should have enough axial depth that a set of radially oriented bolt holes 801 (FIG. 8) may be made into it or them. In other embodiments, the same module 708 maybe provided for a wheel larger than the one shown, such that a gap will exist between the module sidewall 722 and the wheel rim sidewall 710.

The cover seat 724, when the module cover 718 is assembled to the module base 706, abuts an axially forwardly facing land 727 of the base 706. The land 726 may adjoin base perimeter 711. As so assembled, the base 706 and the cover 718 completely and hermetically contain the batteries 714 and the circuit board 726 on which the LEDs and other integrated circuits are mounted. The circuit board 727 may generally be similar in form, function and constitution to circuit board 204 shown in FIGS. 1-5. The electronics mounted on circuit board 727 may be similar to those described in conjunction with FIG. 6. While in the illustrated embodiment the circuit board is flat and perpendicular to axis X, circuit board 727 alternatively could be placed at another (nonzero) angle to axis X and/or could be curved.

Figure 9:
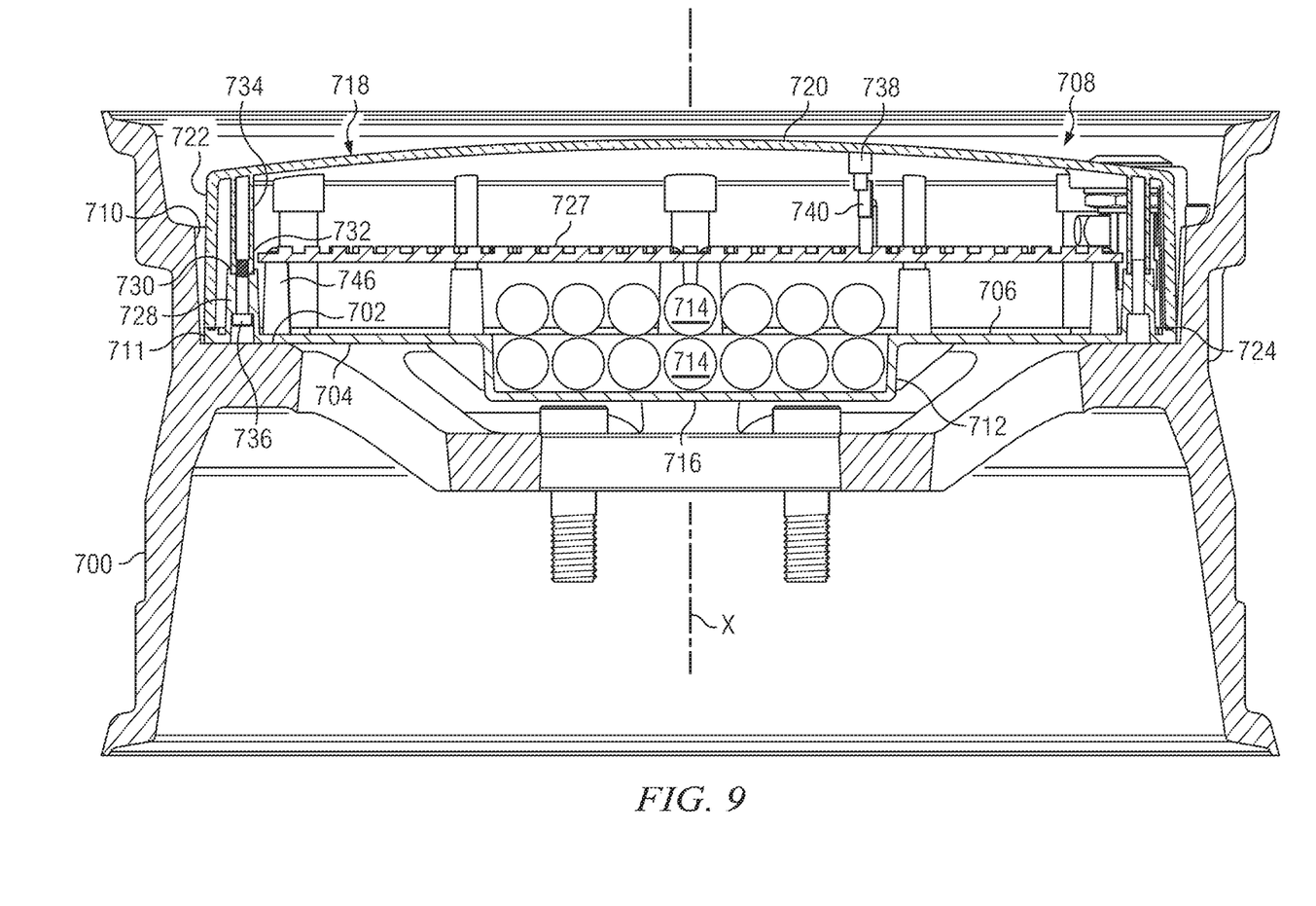
FIG. 9 is a cross-sectional view taken substantially along line 9-9 of FIG. 7.

As best seen in FIG. 9, the base 706 has a plurality of angularly spaced apart bosses 728 which axially forwardly extend from base 706 and which are hollow. In this illustrated embodiment there are six such bosses 728 distributed around and near to the periphery 711 of the base 706. Each boss 728 has an axially forward end 730 that receives an axially rearward end 732 of a respective screw receptacle 734 integrally formed as a portion of the cover 718. Each screw receptacle 734 is hollow, is threaded, and receives the threads of a respective base/cover attachment screw 736 that is inserted into base 706 from its rearward surface 704.

Figure 8:
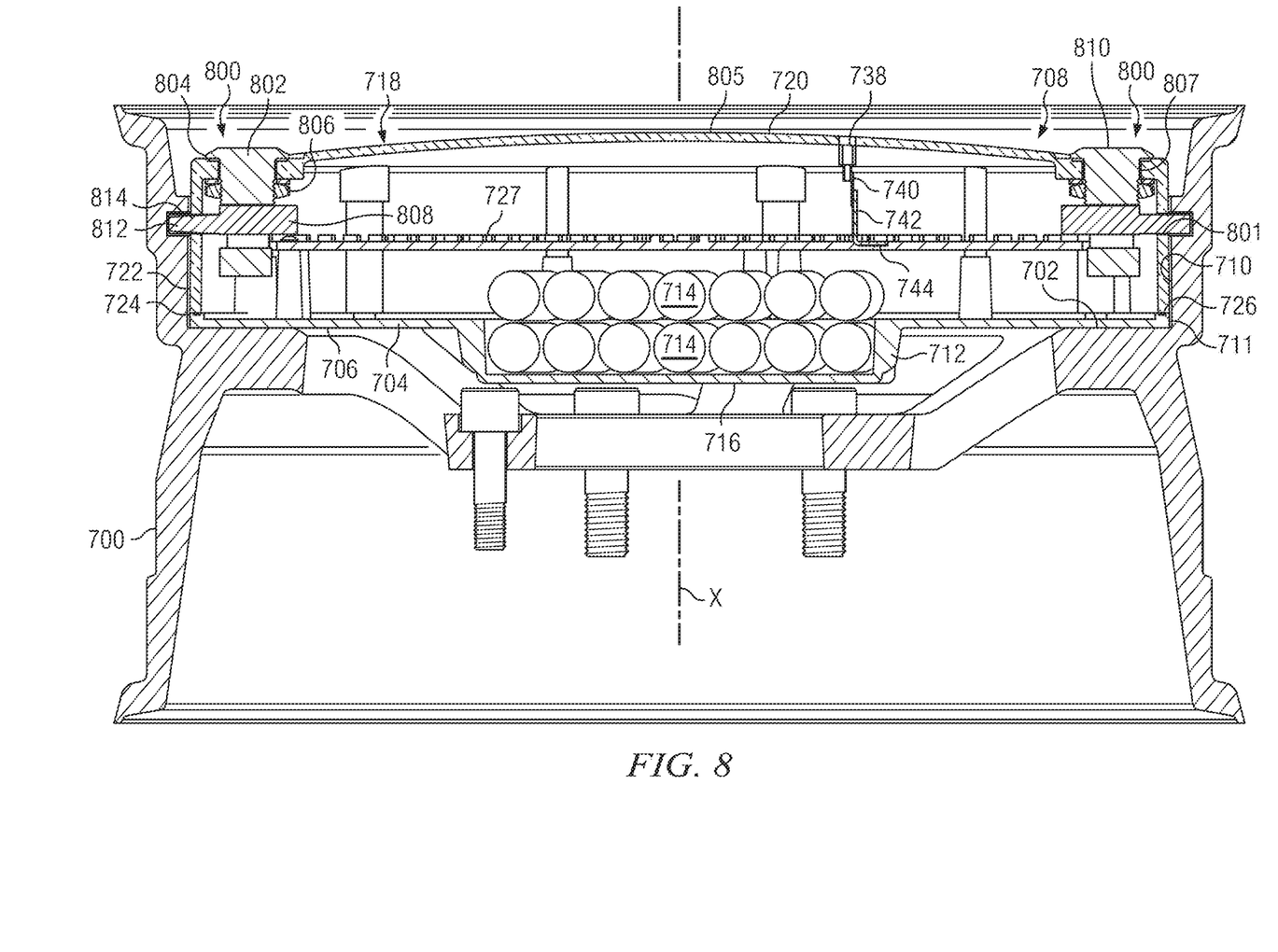
FIG. 8 is a cross-sectional view taken substantially along line 8-8 of FIG. 7.

As seen in FIG. 8, a charging receptacle 738 is formed to extend axially rearwardly from the forward surface 805 of lens 720. Receptacle 738 is sized to receive an end of a charging plug (not shown). A conductive lead 740 extends from a contact surface inside of receptacle 738 to an upstanding member 742 of an L-shaped support bracket 744. Bracket 744 is joined to the circuit board 727. The position of charging receptacle 738 on the lens 720 permits the user to recharge the batteries 714 without removing the module 708 from the wheel 700.

As seen in FIG. 9, set of stanchions 746 stand up from module base 706 and receive respective screws (not shown) to mount the circuit board 727 to the base 706.

Figure 7:
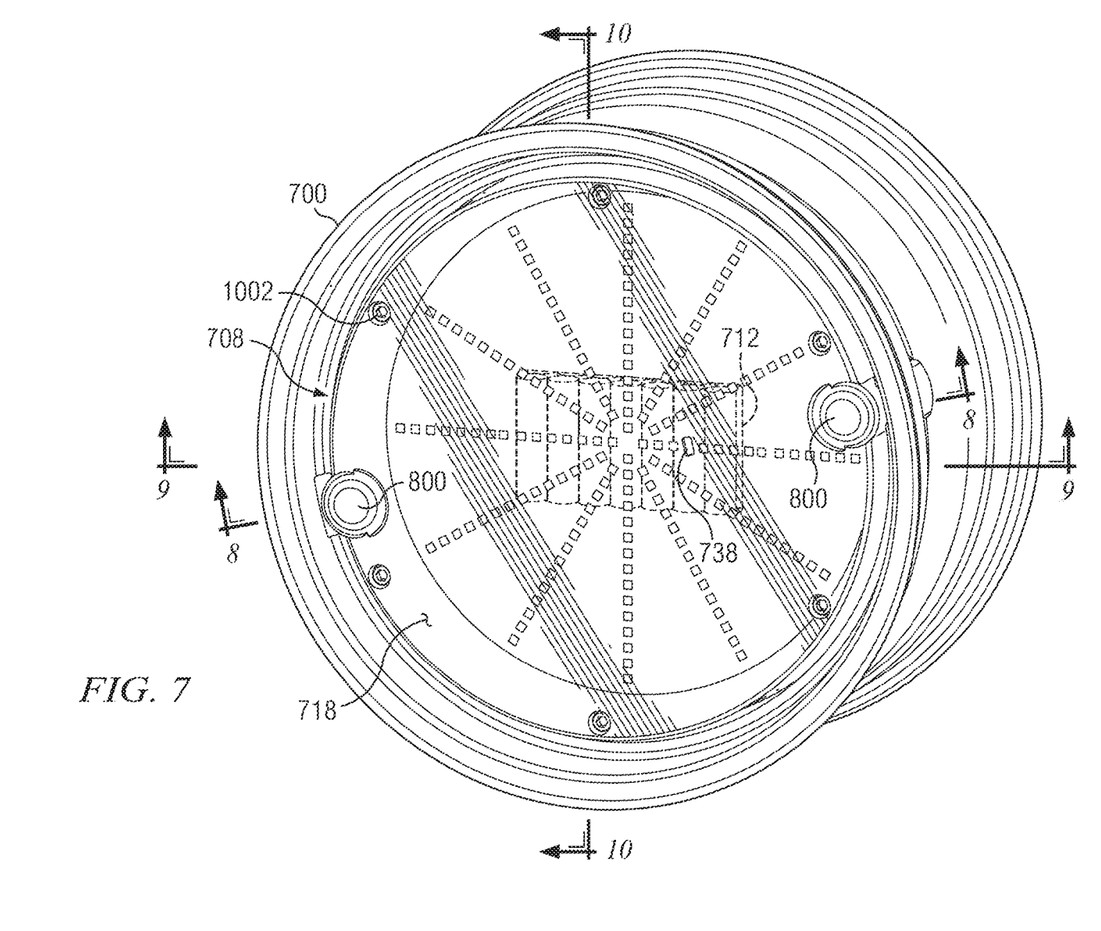
FIG. 7 is a plan view of an assembled illuminated wheel according to a second embodiment of the invention, certain wheel structure being shown in phantom.

As best seen in FIGS. 7 and 8, A plurality of keyed lock assemblies 800 (in this embodiment, two) are radially disposed near but inwardly from a radial margin 711 or base perimeter of the module 708, and preferably are angularly separated from each other by 180 degrees relative to the axis X of module 708. Lock assemblies or cylinders 800 may be similar to the lock cylinders 116 described in conjunction with FIGS. 1-4. But unlike the embodiment shown in FIGS. 1-4, the keyed lock assemblies 800 have main cylindrical bodies 802 that are housed in the module 708 rather than in the wheel 700. The lock assemblies may be positioned radially inwardly from module sidewall 722. Each lock assembly 800 has a forward flange 804 that rests on the axial forward surface 805 of lens 720. Each cylindrical body 802 is closely received in a respective lock cylinder hole 807 formed in lens 720 near its radial periphery. The cylindrical body 802 of each lock assembly 800 may be affixed to the lens 720 by means of a respective threaded nut 806.

Each lock assembly 800 has a radial pin or bolt 808 that reciprocates radially according to the position of a key (not shown) inserted into an axially forward face 810 of the lock assembly 800. In the locked position shown, a radially outer end 812 of the bolt 808 is received into a respective hollow cylindrical bolt receiver 814 bored into wheel sidewall 710, thereby assuming a locked position. When the user desires to remove module 708 from wheel 700, the user turns the key in each lock assembly 800 such that its bolt 808 translates radially inwardly until the bolt end 812 clears the wheel sidewall 710. In some embodiments the bolt end 812 will then be disposed at or radially inwardly from the module sidewall 722, while in other embodiments, particularly where there is some spacing between wheel sidewall 710 and module sidewall 722, the bolt ends 812 may still protrude somewhat from the module sidewall 722.

Figure 10:
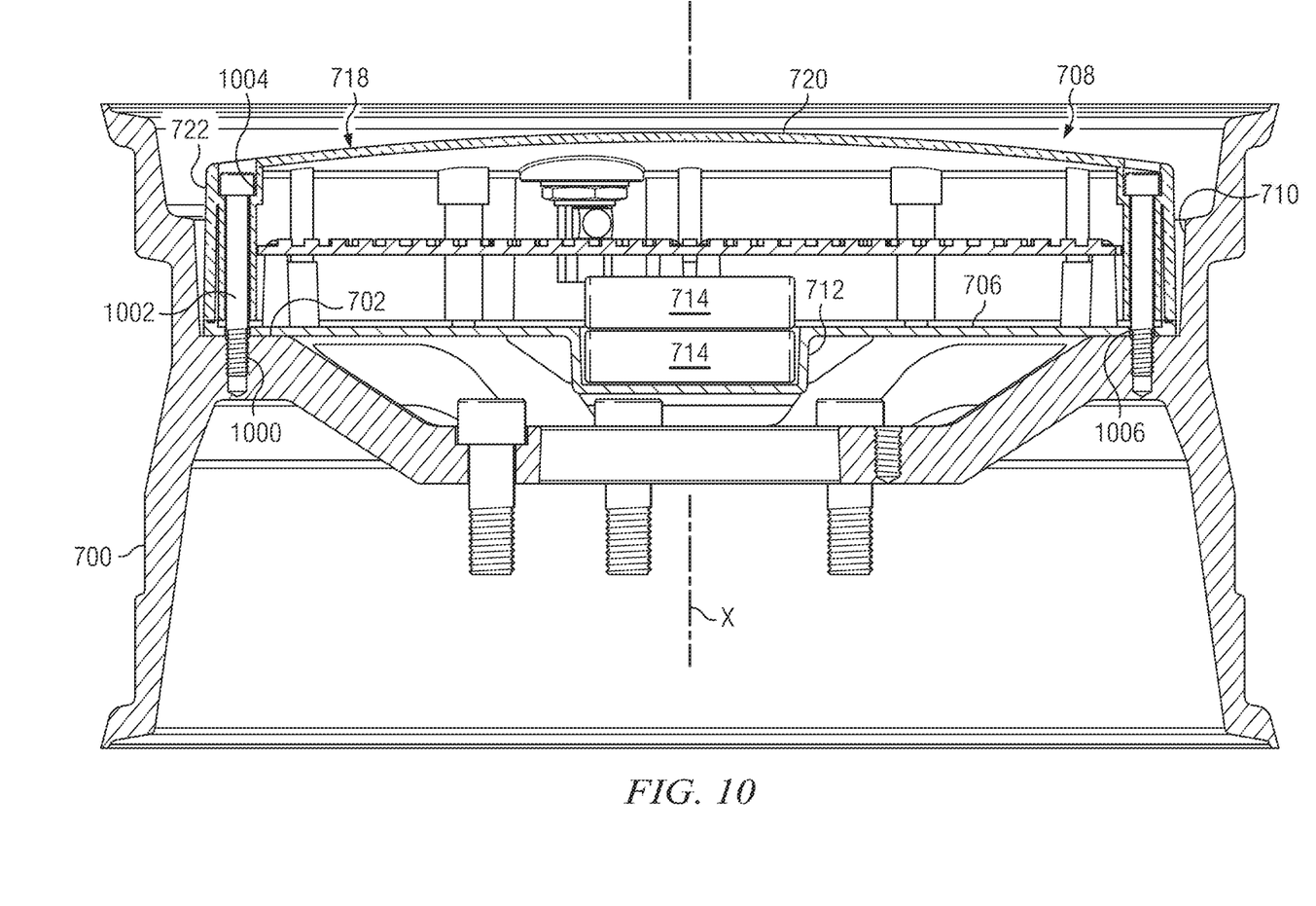
FIG. 10 is a cross-sectional view taken substantially along line 10-10 of FIG. 7.

Referring to FIG. 10, the wheel 700 further has a set of threaded attachment screw bores 1000 that axially rearwardly extend from module mounting face 702. Each of the axially aligned bores 1000 receives a respective module attachment screw 1002 when the module 708 is mounted to wheel 700. In the illustrated embodiment, there are six such screws 1002, angularly equally spaced around axis X, at a similar radial distance from axis X. The module cover 718 has a plurality of axially oriented screw receptacles 1004 that are molded as part of cover 718 and that axially rearwardly extend from lens 720. The screw receptacles 1004 in cover 718 align with respective attachment screw holes 1006 formed in base 706. Each screw 1002 is inserted into a screw receptacle 1004, through a screw hole 1006 and into a respective attachment screw bore 1000. The combination of the axial screws 1002 and the radial bolts 812 (FIG. 8) ensure a firm attachment of the module 708 to the wheel 700.

In summary, an illuminated vehicle wheel has been provided that includes a wheel rim and a lighting module removably attached thereto by both radial bolts and axially oriented attachment screws. While illustrated embodiments of the present invention have been described and illustrated in the appended drawings, the present invention is not limited thereto but only by the scope and spirit of the appended claims.

I claim:

1. An illuminated wheel comprising:
a wheel rim having a front face and arranged around an axis, a sidewall of the rim inwardly facing the axis, a lighting module seating surface formed in the front face of the rim and at an angle to the axis and disposed radially inwardly from the sidewall of the rim, a plurality of module attachment bores formed in parallel to the axis and axially rearwardly extending from the lighting module seating surface, the module attachment bores spaced apart from each other, a plurality of hollow bolt receivers formed in the sidewall of the rim to extend radially outwardly therefrom and to be angularly spaced apart from each other around the axis; and
a lighting module formed around the axis and having a base with a rear surface, a plurality of module attachment screws having respective ends extending axially rearwardly from the rear surface of the base to be received in respective ones of the module attachment bores, at least one sidewall of the lighting module extending axially forwardly from the rear surface of the base, a plurality of hollow bolt holes formed in the lighting module sidewall to be angularly spaced apart from each other around the axis, for each bolt hole, a bolt slidably housed in the bolt hole and having an outer radial end, the bolt operable to extend in a direction away from the axis so that the outer radial end of the bolt is disposed within a respective bolt receiver of the wheel rim so as to assume a locked position, the bolt operable to retract in a direction toward the axis so that the outer radial end of the bolt is disposed radially inwardly from the respective bolt receiver, thereby assuming an unlocked position.

2. The wheel of claim 1, wherein the rim sidewall is substantially cylindrical and said at least one cylindrical sidewall of the lighting module is substantially cylindrical, the lighting module sized to be closely received within a cavity formed by the sidewall of the rim and the lighting module seating surface of the rim.

3. The wheel of claim 1, wherein the module attachment bores are radially spaced from the axis by the same distance.

4. The wheel of claim 1, wherein there are six module attachment bores and six module attachment screws.

5. The wheel of claim 1, wherein the bolts include two keyed bolts angularly spaced apart from each other by 180 degrees around the axis.

6. The wheel of claim 1, wherein the lighting module includes a plurality of light emitting diodes.

7. The wheel of claim 6, wherein the lighting module includes an electronic circuit board disposed at an angle to the axis and having a forward surface and a rearward surface, the light emitting diodes affixed to the forward surface of the electronic circuit board, at least one light emitting diode control integrated circuit affixed to the rearward surface of the electronic circuit board and coupled to the light emitting diodes to selectively actuate the light emitting diodes.

8. The wheel of claim 1, wherein each bolt is a portion of a respective lock cylinder, the the lighting module having a cover attached to and disposed axially forwardly of the base of the lighting module and including said at least one sidewall of the lighting module, for each lock cylinder, a lock cylinder hole formed in the cover and disposed radially inwardly from said at least one sidewall of the lighting module, each lock cylinder having a lock cylinder body inserted into a respective lock cylinder hole and extending axially inwardly therefrom.

9. The wheel of claim 1, wherein the lighting module includes a wireless receiver for receiving command signals, the lighting module further including logic circuitry coupled to the receiver and coupled to each of a plurality of discrete lamps spaced apart from each other, the logic circuitry operable to switch on and switch off each of the discrete lamps responsive to the command signals.

10. A lighting module for attachment to a vehicle wheel, the lighting module comprising:
a base formed at an angle to a wheel axis, the base having an axially rearward surface, the module further having at least one sidewall extending axially forwardly from the rearward surface, said at least one sidewall having a radially outward surface;
a plurality of module attachment screws each having ends that extend rearwardly from the rearward surface of the base in parallel to the axis, the module attachment screws being angularly spaced apart from each other around the axis;
a plurality of bolt holes formed in said at least one module sidewall, the bolt holes being angularly spaced apart from each other, for each bolt hole, a respective bolt received in the bolt hole and having a radially outer end, each bolt operable to extend its outer end beyond the outward surface of the module sidewall and engage structure in the vehicle wheel to assume a locked position, each bolt operable to retract its outer end radially inwardly to assume an unlocked position;
an electronic circuit board affixed to the base and having a rearward side and a forward side disposed in opposition to the base, a plurality of light emitting diodes affixed to the forward side of the electronic circuit board; and
a transparent cover affixed to the base and covering the forward side of the electronic circuit board.

11. The lighting module of claim 10, wherein said at least one module sidewall is formed as a portion of the transparent cover.

12. The lighting module of claim 10, wherein said at least one module sidewall is a single module sidewall formed as a surface of rotation around the axis.

13. The lighting module of claim 10, wherein the module attachment screws are positioned at the same radius from the axis.

14. The lighting module of claim 10, wherein there are six module attachment screws.

15. The lighting module of claim 10, wherein the cover has a plurality of attachment screw bores and the base has a plurality of attachment screw holes in alignment with the attachment screw bores of the cover, the cover having a forward surface, each attachment screw extending from the forward surface of the cover axially rearwardly through the rearward surface of the base.

16. The lighting module of claim 10, wherein the respective bolts include two bolts angularly spaced apart from each other by 180 degrees.

17. The lighting module of claim 10, wherein each bolt is mounted in, and is radially extensible and retractable away from and toward, a respective bolt cylinder, the cover having a forward surface, each bolt cylinder affixed to the cover to extend axially rearwardly from the forward surface of the cover.

18. The lighting module of claim 10, further comprising a plurality of logic integrated circuits mounted on the rearward side of the electronic circuit board and coupled to the light emitting diodes to selectively switch on and switch off the light emitting diodes.

19. The lighting module of claim 10, wherein the cover includes an axially forward surface, a charge port formed in the forward surface of the cover, a lead extending axially forwardly from the electronic circuit board to be in conductive communication with the charge port.

* * * * *